United States Patent Office 2,992,075
Patented July 11, 1961

2,992,075
PREPARATION OF CARBON BLACK
Zsigmond de Galocsy, 13 Rue de la Madeleine, Brussels, Belgium, and Jean Prunet, 77 Blvd. Malesherbes, Paris, France
No Drawing. Filed July 24, 1958, Ser. No. 750,594
Claims priority, application France Aug. 9, 1957
4 Claims. (Cl. 23—209.6)

This invention relates to this preparation of carbon black from hydrocarbon materials.

Conventional commercial processes for preparing carbon black from gaseous and liquid hydrocarbons such as methane, acetylene, naphthalene, oils, tars, and the like, rely on an incomplete combustion of the hydrocarbons in accordance with a reaction of the type $$CH_4 + O_2 + 3.8N_2 \rightarrow C + 2H_2O + 3.8N_2 \tag{1}$$

Such processes however have a very poor yield on the order of only 30% in the more favourable cases, so that a major proportion of about 70% or more of the initial hydrocarbon goes to waste.

It is the main object of this invention to provide an improved method of preparing carbon black from hydrocarbon material which will have substantially higher yields than heretofore believed possible, yields twice and more than twice higher than in the conventional processes being attainable with the invention.

The invention for this purpose employs a reversible reaction of an hydrocarbon in gas or vapour form with carbon dioxide, of the general type $$CH_4 + CO_2 \rightleftharpoons 2C + H_2O \tag{2}$$

to provide a novel industrial process of carbon black preparation.

The Reaction 2 has a number of theoretical advantages over Reaction 1 as concerns the preparation of carbon black. In the first place, it yields carbon black both from the hydrocarbon and from the carbon dioxide constituents. Moreover the thermodynamic conditions present in Reaction 2 are decidedly more favourable than those in Reaction 1 because of the absence of the "dead-weight" provided by the inert nitrogen gas in Reaction 1.

However, a number of serious practical difficulties are encountered when it is desired to apply Reaction 2 to a commercial carbon black process with a high yield. The chief difficulty is the necessity of operating at relatively high temperatures approximating the cracking or splitting temperatures of the hydrocarbon and the carbon dioxide, if an optimum conversion ratio of carbon black is to be obtained. At such high temperatures however, numerous secondary reactions tend to arise, including especially formation of water gas at the expense of the carbon obtained in the basic reaction, as the result of secondary reaction $$2C + 2H_2O \rightarrow 2CO + 2H_2$$

thereby substantially reducing the yield. It is, therefore, an important object of this invention to minimize the progress of this and other secondary reactions and thereby increase the yield.

According to the invention, the reagents are reacted at the appropriate elevated reaction temperature for an extremely short period of time of substantially less than one second, and are thereupon very rapidly cooled. In one desirable embodiment of the invention, the hydrocarbon and carbon dioxide are first mixed together, preferably at low temperature, and the mixture is then introduced into a reactor and heat is very rapidly applied to provide the desired reaction temperature for a very brief period of time.

The reaction temperature used will depend on a number of factors including the character of the hydrocarbon used, the pre-heating temperature of the reagents, pressure in the reactor, the relative concentrations of $CO_2$ and hydrocarbon, the character of the catalyst present if any is used, but for the purposes of the invention a preferred range of temperatures may be stated as approximately from 900 to 1200° C.

As for the period of time the reagents are reacted in the method of the invention, this may be generally indicated as lying within an approximate range of from 1/1000 to 1/10 of one second.

In one form of the invention the reagents are first separately preheated to a temperature approximating the final reaction temperature and are then contacted so that the reaction will occur very rapidly and preferably without any additional heat being supplied.

The reaction temperature of the mixture may be adjusted by limiting the preheating temperature of the reagents, as by subtracting a quantity of heat equivalent to that which will be subsequently supplied by the exothermal reaction, or by providing the reactor with a suitable cooling system. In this way, the contact time can be readily reduced to the desired short fraction of a second, and this in turn is conducive to a number of remarkable advantages. Thus, the volume of the reactor apparatus can be substantially reduced and thereby provide efficient and rapid cooling of the reaction end products. Also, progress of the secondary reactions are greatly limited as already indicated.

The characteristics of the final carbon black product may be controlled by controlling the preheating temperature, the reaction temperature and time, as well as the proportion of the reagents. Thus, at very high temperatures and a comparatively long reaction time (though still substantially less than one second) a very hard grade of carbon black is obtained having a substantially graphitic texture.

Where the hydrocarbons available for the process comprise substantially pure hydrocarbons such as natural gas for example, the characteristics of the end product may be conveniently controlled by adjusting the stoichiometrical proportions of the reagents. A similar effect can be obtained by recycling all or part of the gas produced by the reaction back to the reactor.

By the method of the invention carbon black yields can be obtained on the order of about from 60% to 80% in terms of the total carbon in the reaction mixture, or a yield of about 120% to 160% in terms of the carbon content in the hydrocarbons used.

One advantageous source of reagents for the method of the invention besides natural gas, is provided by residual gases having a comparatively high hydrocarbon content. Thus, residual gases from coke plants, residual gases from Fischer-Tropsch synthesis processes, from methanol synthesis and mineral oil refining plants can all be used. This last source is particularly desirable from an economical standpoint since heretofore the residual gases from oil refining plants have generally been burned and thus completely wasted.

Since the gases derived from many of the sources of the class just mentioned contain in addition to hydrocarbons a number of other gases such as hydrogen, carbon monoxide, nitrogen, and the like, the amount of final residual gas produced at the end of the process of the invention may reach a considerable volume and can then advantageously be used to produce carbon dioxide. The method of the invention can thus be worked as a closed-cycle process. No external source of heat is required.

Further, the production of carbon black by the method of the invention can further be used to produce valuable combustible gas of the types resembling water gas, synthesis gas and city gas. Thus, for the production of city gas, suitable catalysts may be added to produce a predominant amount of light hydrocarbons, or some unreacted hydrocarbon may be added to raise the heating power of the final gas which chiefly comprises $CO+H_2$. The combustible gas by-product may advantageously serve to pre-heat the reagents and/or provide additional heat for the reaction.

It will be understood that various modifications may be made in the specific details of the operating procedure followed. Thus the hydrocarbon and carbon dioxide reaction may be carried out in the presence of suitable catalysts for substantially lowering the reaction temperature below the range indicated above as being the preferred range. Moreover, where the reaction temperature used is higher than the hydrocarbon cracking temperature, so that it would not then be possible to preheat the hydrocarbon to the reaction temperature, a procedure may be used wherein the $CO_2$ is preheated to such a high temperature that on being contacted with the hydrocarbon reagent preheated to its maximum permissible temperature, the resulting temperature of the reaction mixture will equal the desired reaction temperature; alternatively the reactor may be preheated, and/or additional heat may be provided from an external source. As an example of this latter procedure, lime kiln gas may be used, which contains about 60% $N_2$ serving as a carrier. Similarly it will be noted that a mixture of hydrocarbons may be heated to higher temperatures than can pure $CH_4$.

What we claim is:

1. A method producing carbon black comprising the steps of separately preheating at least one hydrocarbon of the type $C_nH_m$ in the gaseous state up to a temperature below the decomposition temperature of said hydrocarbon and a substantially molecularly equivalent amount of carbon dioxide in the form of a gas containing at least 40 percent pure $CO_2$ to a temperature sufficiently higher than said preheating temperature of the hydrocarbon so that, upon mixing of the substantially stoichiometric quantities of preheated hydrocarbon and carbon dioxide, the mixture has a temperature in the range between 900° C. and 1200° C., conducting the mixture of preheated hydrocarbon and carbon dioxide through a reaction zone wherein the reaction $$C_nH_m + \frac{m}{4}CO_2 = \left(\frac{n}{1}+\frac{m}{4}\right)C + \frac{m}{2}H_2O$$

is effected during a period of 0.001 to 0.1 second, removing the products of said reaction from said reaction zone at the end of said period, and immediately cooling said products to recover the carbon black therefrom.

2. A method of producing carbon black as in claim 1; wherein all heat required for reacting the hydrocarbon with the carbon dioxide in the reaction zone is supplied by the separate preheating of said hydrocarbon and carbon dioxide.

3. A method of producing carbon black as in claim 1; where in said reaction products include carbon black and a combustible gaseous reaction product, and further comprising the step of burning said combustible gaseous reaction product for said preheating of the hydrocarbon and carbon dioxide.

4. A method of producing carbon black as in claim 1; wherein said reaction products include carbon black and a gaseous reaction product, and further comprising the step of treating said gaseous reaction product to produce carbon dioxide therefrom for use in the reaction.

References Cited in the file of this patent
UNITED STATES PATENTS

| | | |
|---|---|---|
| 1,364,273 | Gerard et al. | Jan. 4, 1921 |
| 1,396,018 | Bradley | Nov. 8, 1921 |
| 1,804,249 | Day | May 5, 1931 |
| 1,868,919 | Schmidt et al. | July 29, 1932 |
| 2,564,700 | Krejci | Aug. 21, 1951 |
| 2,773,744 | Antonson | Dec. 11, 1956 |

FOREIGN PATENTS

| | | |
|---|---|---|
| 112,416 | Germany | June 29, 1900 |

OTHER REFERENCES

Mellor: Treatise on Inorganic and Theoretical Chemistry, vol. 6, page 67, Longmans, Green and Co., N.Y., 1925.